(12) United States Patent
Agarwal et al.

(10) Patent No.: US 10,043,184 B2
(45) Date of Patent: Aug. 7, 2018

(54) SYSTEMS AND METHODS FOR IMPLEMENTING TRANSACTIONS BASED ON FACIAL RECOGNITION

(71) Applicant: PAYPAL, INC., San Jose, CA (US)

(72) Inventors: Priyanshu Agarwal, Chennai (IN); Prasanna Annamalai, Chennai (IN)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/292,061

(22) Filed: May 30, 2014

(65) Prior Publication Data
US 2015/0348045 A1     Dec. 3, 2015

(51) Int. Cl.
| | | |
|---|---|---|
| *G06Q 20/40* | (2012.01) | |
| *G06Q 20/22* | (2012.01) | |
| *G06Q 20/10* | (2012.01) | |
| *G06Q 50/00* | (2012.01) | |
| *G06K 9/00* | (2006.01) | |

(52) U.S. Cl.
CPC ... *G06Q 20/40145* (2013.01); *G06K 9/00248* (2013.01); *G06K 9/00261* (2013.01); *G06K 9/00268* (2013.01); *G06Q 20/10* (2013.01); *G06Q 20/223* (2013.01); *G06Q 50/01* (2013.01); *G06K 9/00288* (2013.01)

(58) Field of Classification Search
CPC ...................................................... G06Q 20/40
See application file for complete search history.

(56) References Cited

U.S. PATENT DOCUMENTS

| | | | |
|---|---|---|---|
| 2004/0258281 A1 | 12/2004 | Delgrosso et al. | |
| 2006/0018522 A1* | 1/2006 | Sunzeri | G06F 17/30247 382/118 |
| 2006/0158307 A1* | 7/2006 | Lee | G06K 9/00221 340/5.53 |
| 2009/0140838 A1* | 6/2009 | Newman | G06Q 20/40 340/5.83 |
| 2010/0030696 A1 | 2/2010 | Naccache | |
| 2010/0066822 A1* | 3/2010 | Steinberg | G06K 9/00208 348/77 |

(Continued)

OTHER PUBLICATIONS

Aru, et al. Facial Verification Technology for Use in ATM Transactions. 2013, Facial Verification Technology for Use in ATM Transactions, www.ajer.org/papers/v2(5)/Y02501880193.pdf. (Year: 2013).*

*Primary Examiner* — Kito R Robinson
*Assistant Examiner* — Shacole C Tibljas
(74) *Attorney, Agent, or Firm* — Haynes and Boone, LLP (57) ABSTRACT

A system or method is provided to facilitate a payment transaction by utilizing facial recognition to identify the payee of the payment transaction. In particular, the system may remember a particular list of individuals to which a user has been or are frequently making payments. The facial profiles of the individuals in the particular list may be stored and referenced for identification. When the user is ready to transfer money to any of the frequent payees, the user may use any of the payee's pictures locally, anywhere on social platforms, or just by clicking the person. After the image is selected for payment, the system may analyze the image to match the image with existing face profiles of respective frequent payees. Once the payee is identified, the system may process the payment to the identified payee.

19 Claims, 4 Drawing Sheets

(56) References Cited

U.S. PATENT DOCUMENTS

| | | | |
|---|---|---|---|
| 2012/0158582 A1* | 6/2012 | Nuzzi | G06Q 20/10 |
| | | | 705/40 |
| 2012/0281887 A1* | 11/2012 | Yamaguchi | G06F 17/3025 |
| | | | 382/118 |
| 2013/0121584 A1* | 5/2013 | Bourdev | G06K 9/00281 |
| | | | 382/190 |
| 2014/0279543 A1* | 9/2014 | Ruhrig | G06Q 50/01 |
| | | | 705/44 |
| 2015/0039643 A1* | 2/2015 | Tong | G06F 17/30253 |
| | | | 707/766 |
| 2015/0046320 A1* | 2/2015 | Baldwin | G06Q 50/12 |
| | | | 705/40 |

* cited by examiner

SYSTEMS AND METHODS FOR IMPLEMENTING TRANSACTIONS BASED ON FACIAL RECOGNITION

BACKGROUND

Field of the Invention

The present invention generally relates to systems and methods for implementing transactions based on facial recognition.

Related Art

In today's commerce, many payment transactions, such as retail purchases, payment transactions, and the like, are made electronically using electronic devices, such as mobile phones or mobile computing devices. For example, a consumer may install a payment app on his or her mobile device to facilitate payments to various merchants or recipients. A consumer's peer to peer money transfers are with a particular list of peers composed mostly of his/her friends or family members. Today, irrespective of the frequency of money transfers, any peer to peer transfer follows the usual flow of authentication and identification of payees, e.g., the payer has to enter the name or identification of the payee. This may be inconvenient if the payer is on the run or has no access to an information entry device, such as a keyboard. Thus, there is a need for an easier process when making a money transfer to others.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a system or method may be provided to facilitate a payment transaction by utilizing facial recognition to identify the payee of the payment transaction. In particular, the system may remember a particular list of individuals to which a user has been or are frequently making payments. The facial profiles of the individuals in the particular list may be stored and referenced for identification. In an embodiment, the user may define the list of individuals who may be identified by facial recognition for making payments. The user may provide or identify pictures of the individuals for the system to analyze and store. For example, the user may take pictures of an individual and identify the individual as a person who may be paid by the user using facial recognition. The user also may designate pictures stored in a user device to associate the pictures with the individual.

In another embodiment, the system may analyze the user's transaction history to identify individuals to whom the user frequently makes payments. The system may find or receive pictures of these frequent payees and may analyze these pictures to learn their respective facial profiles. In particular, the system may inquire the user whether the list of frequent payees should be set automatically or manually. If the user chooses to set the list of frequent payees automatically, the system may review and analyze the user's transaction history to find frequent payees. The system may continuously update the list of frequent payees by periodically reviewing and analyzing the user's transaction history. If the user chooses to set the list of frequent payees manually, the system may accept user's entries of the list of frequent payees. The system may provide a list of individuals from the user's contact list or social network to be selected by the user.

After the frequent payees are selected, the system may begin to train itself to recognize the face/image of the individuals. The images may be provided by the user uploading pictures or by the user taking pictures of the individuals. In some embodiments, the system may begin to analyze the user's contact list, social networks, transaction profiles, and the like to find and analyze pictures of the individuals who are on the frequent payee list. The system may then compute or determine a map of a vector of images and person's identity, which may be used to identify an individual based on facial recognition.

When the user is ready to transfer money to any of the frequent payees, the user may use any of the payee's pictures locally, anywhere on social platforms, or just by clicking the person. For example, the user may right click on an image of the individual, which then shows a menu. The user may select "pay this person" from the menu. After the image is selected for payment, the system may analyze the image to match the image with existing face profiles of respective frequent payees. In particular, the system may compute a similarity score for the image against the stored images of the various frequent payees. Based on the similarity score, an individual with the highest similarity score, which indicates the best match, may be found from the list of frequent payees.

Once the match is found, the individual corresponding to the best match may be notified to the user. If the user acknowledges that the individual is correct, the selected image may be added to the image vector for that matched individual. Thus, the system may continuously learn and improve facial recognition for the frequent payees based on the user's input. If the user confirms the individual, the system may ask the user for the amount the user wishes to transfer. The user may enter an amount to be transferred to the identified individual and the system may proceed to complete the fund transfer process.

Therefore, the system or method may identify a list of frequent payees to whom the user frequently makes payments based on the user's transaction history and/or based on the user's designation. Further, the system or method may allow the user to make payments to an individual by simply clicking or otherwise selecting on an image of the individual or by taking a picture of the individual using the user's mobile device. The system may also enable a payment to an individual payee, where an image of the payee is part of a group photograph or image. In that case, the system identifies the payee as one in which the user has previously made a payment to or is otherwise identified or associated with the user. If images of multiple people are identified in the image, the user may be provided a list of those for selection. This may allow a feature such as "click and pay" which may improve user experience in a payment transaction.

Other uses for the system or method may include: allowing two people who are together to make payments to each other by taking an image of one another. If the payee is not present, the payer may click an image of the payee shown on the user's contact list or social network profile to pay the payee. In an aspect, because the system is identifying an individual from a defined list of frequent payees, the system may perform the analysis relatively fast, as compared with having to identify an individual from a large database of individuals.

Figure 1:
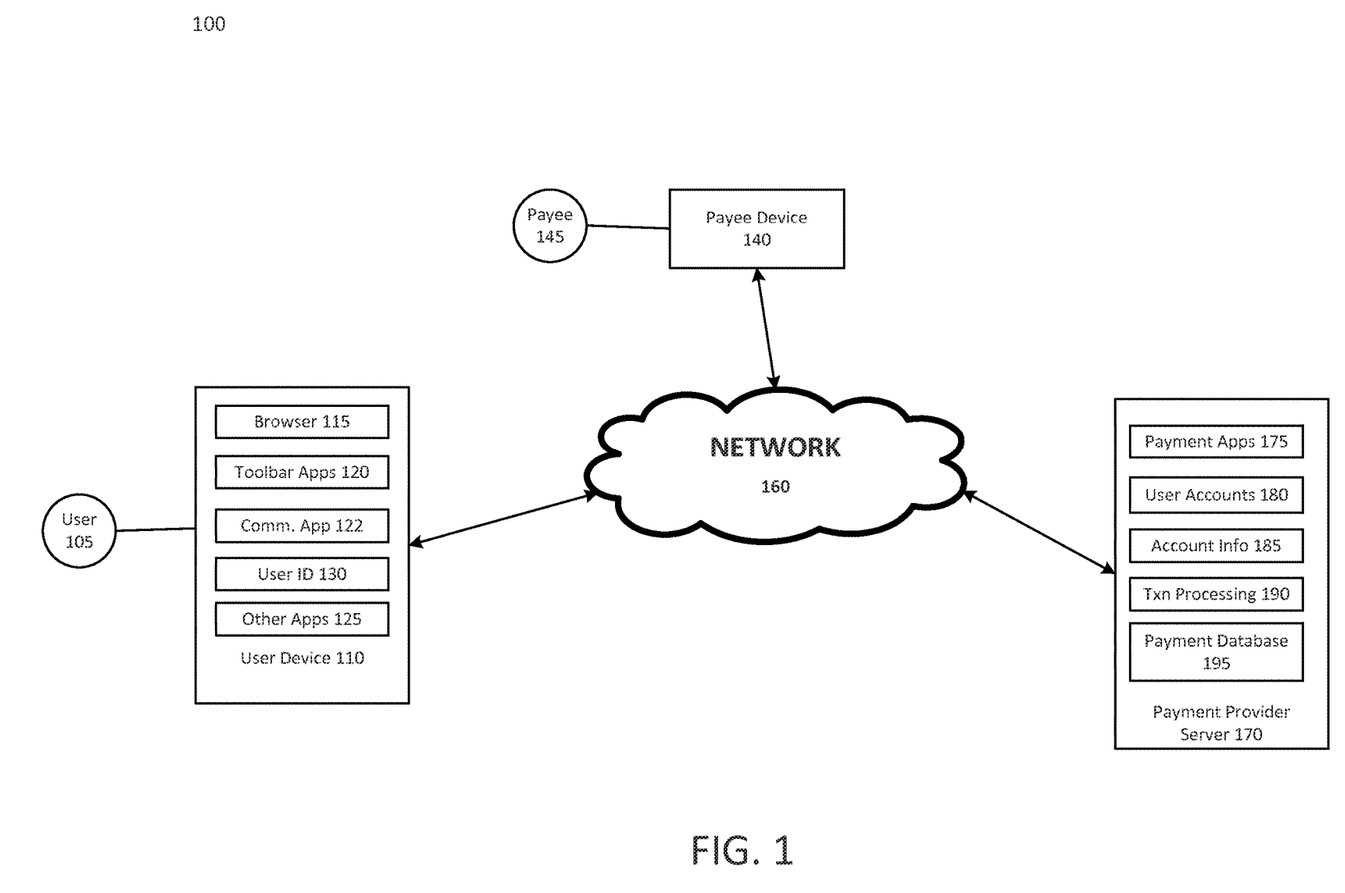
FIG. 1 is block diagram of a networked system suitable for implementing transactions via facial recognition according to an embodiment.

FIG. 1 is a block diagram of a networked system 100 configured to implement a process for implementing payments via facial recognition in accordance with an embodiment of the invention. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a payee device 140, and a payment provider server 170 in communication over a network 160. Payment provider server 170 may be maintained by a payment service provider, such as PayPal, Inc, of San Jose, Calif. A user 105, such as a consumer, may utilize user device 110 to perform an electronic transaction using payment provider server 170. For example, user 105 may utilize user device 110 to make a payment transaction to a payee 145. The payee 145 may be notified of the transaction at the payee device 140. Further, user 105 may utilize user device 110 to initiate a payment transaction, receive a transaction approval request, or reply to the request. Note that transaction, as used herein, refers to any suitable action performed using the user device, including payments, transfer of information, display of information, etc.

User device 110, payee device 140, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, wearable device, laptop computer, and/or other types of computing devices capable of transmitting and/or receiving data, such as an iPad™ or an iPhone™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115. User device 110 also may include other applications to perform functions, such as email, texting, voice and IM applications that allow user 105 to send and receive emails, calls, and texts through network 160, as well as applications that enable the user to communicate, transfer information, and make payments through the payment provider as discussed above.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

User device 110 may install and execute a payment application received from the payment service provider to facilitate payment processes. The payment application may allow the user 105 to send payment transaction requests to the payment service provider. In particular, the payment application may authenticate user 105 before making payments. In an embodiment, the payment application may allow payment transactions via facial recognition.

User device 110 may include a camera configured to capture or scan images. User device 110 also may store a contact list and/or social network accounts of the user 105. The contact list and/or the social network accounts may include information regarding people or peers associated with or related to the user 105. The information may include pictures or images of the people associated with the user 105.

Payee device 140 may be operated by payee 145. The payee device 140 may have similar components and functions as that of user device 110. For example, the payee device 140 may perform various communications via network 160. When a payment is made to the payee 145, the notification of the payment may be presented to the payee 145 at the payee device 140. The payee 145 may have an account registered at the payment provider server 170 to receive and make payments.

Payment provider server 170 may be maintained, for example, by an online payment service provider which may provide payment between user 105 and the payee 145. In this regard, payment provider server 170 may include one or more payment applications 175 which may be configured to interact with user device 110 and/or payee device 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, user names, phone numbers, credit card information, bank information, or other financial information which may be used to facilitate online transactions by user 105. Account information may also include user's pictures and/or facial profiles.

A transaction processing application 190, which may be part of payment application 175 or separate, may be configured to receive information from a user device and/or payee device 140 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Payment application 175 may be further configured to determine the existence of and to manage accounts for user 105, as well as create new accounts if necessary.

In one embodiment, payment provider server 170 may receive information related to payees designated by user 105 for payments via facial recognition, e.g., identifying payee by facial recognition. For example, a group of frequent payees may be designated for payment via facial recognition. Images or pictures of the designated payees may be collected and analyzed to create facial profiles for the designated payees. As such, the user 105 may identify a payee by selecting a picture or an image. The system may then identify the payee by analyzing the selected picture or image.

Figure 2:
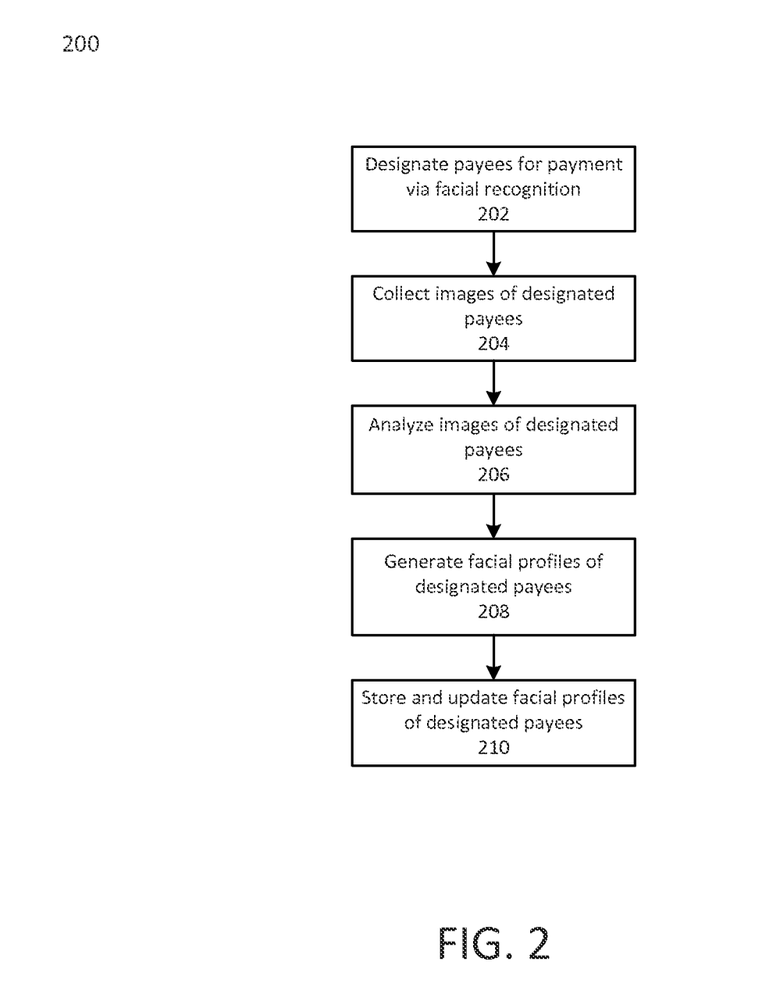
FIG. 2 is a flowchart showing a process for setting up facial profiles of payees according to one embodiment.

FIG. 2 is a flowchart showing a process for setting up facial profiles of payees according to one embodiment. At step 202, one or more payees may be designated for transactions by facial recognition. In an embodiment, the user device 110 or the payment provider server 170 may monitor transaction history to determine frequent payees. These frequent payees may then be suggested to the user 105 to be designated for transactions by facial recognition. In another embodiment, the user 105 may select a group of payees to be designated for transactions by facial recognition. A contact list or a list of friends from the user 105's social network may be presented to the user 105 for the user 105 to select designated payees.

At step 204, images or pictures of the designated payees may be collected. For example, with the user 105's permission, the user 105's social network accounts, contact lists, digital photo albums, and the like may be accessed to find pictures of the designated payees. These pictures may previously be tagged by user 105 or others to identify people included in the pictures. Thus, pictures of the designated payees may be identified and collected. In an embodiment, the system may request that user 105 identify one or more of the designated payee's pictures. The user 105 may find pictures or images of the designated picture stored in user device 110 or online. The user 105 also may use a camera included with user device 110 to capture a picture of the designated payees in person when the payees are present to the user 105.

At step 206, the user device 110 or the payment provider server 170 may analyze the images or pictures of the designated payees. In particular, facial recognition algorithms may be used to perform image analysis to identify facial features or landmarks of the facial images. The relative position, size, and/or shape of the eyes, nose, cheekbones, jaw and the like may be analyzed. The skin texture of the payees also may be analyzed. At step 208, a facial profile may be generated for each of the designated payees. The facial profile may indicate features or landmarks that distinguish a face of a payee from the others. The facial profile of a payee may be continuously improved as more images or pictures of the payee become available for analysis. Thus, the system may continue to improve the facial profile of each payee to improve the accuracy of facial recognition.

At step 210, the facial profiles of the designated payees may be stored and continuously updated. For example, when more pictures or images of a payee are identified on the social network or are submitted by the user 105, the facial profile of the payee may continuously be updated to improve facial recognition of the payee. In particular, the user 105's feedback, whether positive or negative, may be used to improve the facial profiles of the designated payees. For example, the user 105 may provide feedback to a result of a facial recognition, which may be positive, e.g., correct recognition, or negative, e.g., wrong recognition, the system may learn from these feedbacks to improve the facial profiles of the designated payees.

In an embodiment, the facial profile of a payee may be improved by information and images provided from the user 105. The facial profile of the payee also may be improved by information and images provided from other users. Thus, the facial profile of the payee may be improved by crowd sourcing. In an embodiment, the facial profile of a payee may evolve over time as the look of a person may change over time. As such, pictures or information that are older than a certain time limit may no longer be incorporated in the facial profile of a payee to ensure that only most recent pictures or information are used for the facial profile.

By using the above process 200, a facial profile may be set up for each designated payee for performing transaction using facial recognition. In particular, transaction history may be analyzed to suggest a group of frequent payees to the user 105. Further, the system may collect pictures or images from the user 105's contact list, digital photo albums, social network accounts, photo accounts, and the like. The user 105 also may submit pictures of the payees by taking pictures of the payees in person using a camera. The collected pictures or images may be used to set up and improve the facial profiles.

Figure 3:
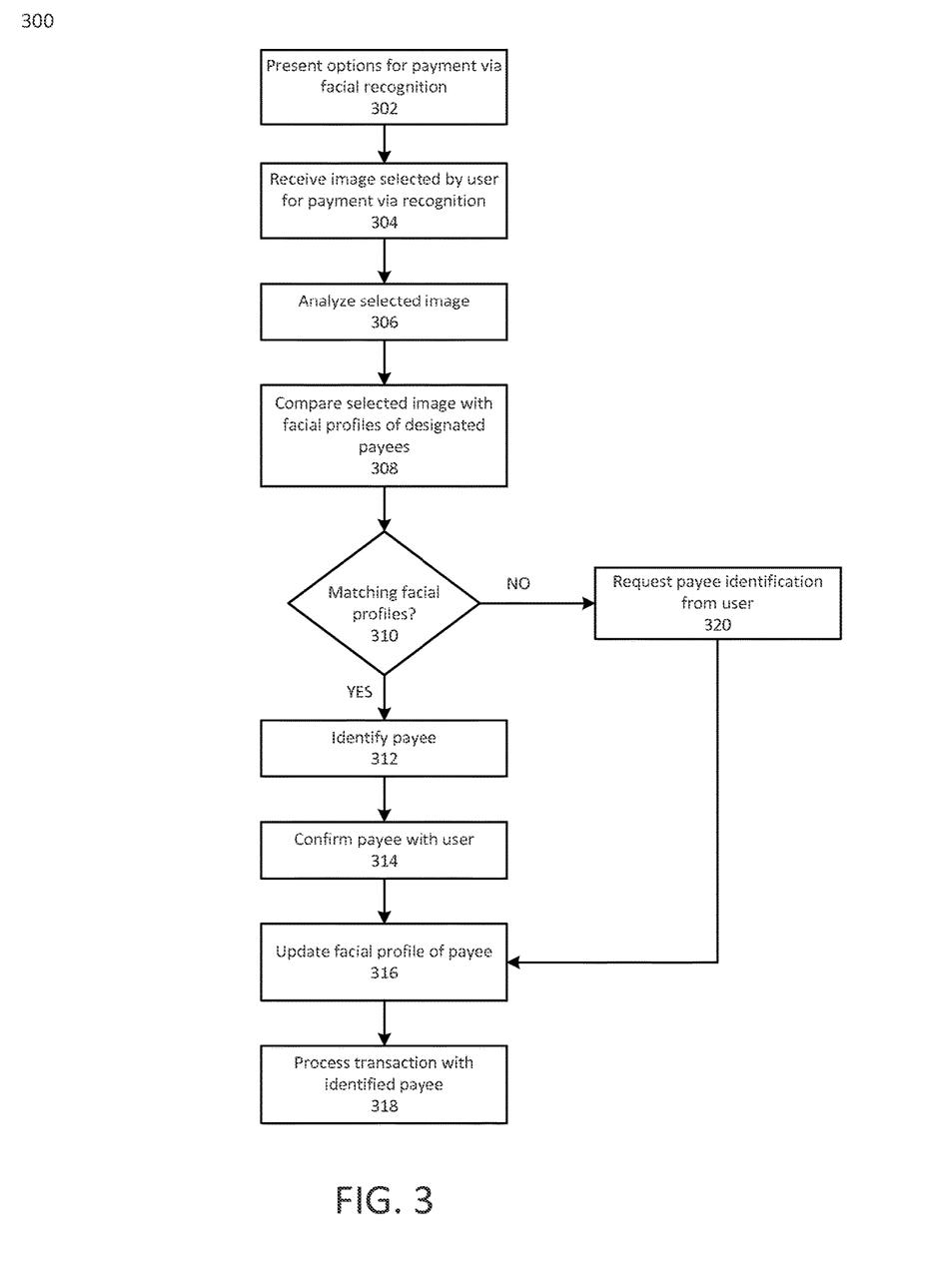
FIG. 3 is a flowchart showing a process for implementing payments via facial recognition according to one embodiment.

FIG. 3 is a flowchart showing a process for implementing payments via facial recognition according to one embodiment. At step 302, the user device 110 or the payment provider server 170 may present options for payment by facial recognition. For example, a payment application provided by the payment service provider may be downloaded and installed at the user device 110. The payment application may present a menu for facilitating payment transactions. The menu may present an option that allows the user 105 to "pay by picture."

In another embodiment, the payment application may coordinate with the operating system of the user device 110 to provide additional operations related to an image displayed at the user device 110. For example, when the user 105 right clicks or taps on an image displayed on the user device 110, a menu may pop up to provide various functions related to the image, such as copy, save, save as, and the like. An additional function, such as "pay this person" may be inserted into this pop up menu. Thus, the user 105 may tap or right click on a picture or an image of a payee displayed on the user device 100 to initiate a payment to the payee.

In an embodiment, the "pay this person" option may be displayed for facial images displayed on the user device 110. For example, the user device 110 may analyze images displayed on the user device 110 to differentiate images between facial and non-facial images. If the image is a facial image, the user device may further determine whether the facial image belongs to one of the designated payees by using facial recognition. If so, the option of "pay this person" may be applied to this facial image to allow the user 105 to pay this payee by clicking on this image. If the facial image does not belong to any of the designated payees, an option may be provided to allow the user to designate the person associated with the facial image to be a designated payee that may be paid using facial recognition.

At step 304, the user device 110 or the payment provider server 170 may receive an image selected by the user 105 for payment. For example, the user 105 may select a facial image displayed on the user device 110 to make a payment. The facial image may be a head shot of a payee or a facial image within a picture including other facial images. If the facial image is a portion of a larger image, the position where the user tapped or clicked may be used to determine which portion of the larger image should be analyzed for facial recognition. As such, the portion of the picture with the selected facial image may be extracted from the picture for analysis. In an embodiment, the user 105 have the option of taking a picture of a payee in person using a camera included with the user device 110. For example, when "pay with picture" option is selected, the user 105 is allowed to choose whether the picture is to be selected from a contact list, a displayed page, a digital photo file, a social network, or by capturing a picture of a payee in person. As such, the user 105 may select an image or capture an image of the payee from various sources.

At step 306, the user device 110 or the payment provider server 170 may analyze the selected image. For example, the selected image may be processed to enhance certain landmarks or facial features. In an embodiment, the image may include a tag or metadata that may identify an individual associated with the facial image. At step 308, the unique features of the facial image may be compared to the ones of the facial profiles of the designated payees. Because the selected image is compared with a defined group of facial profiles, the process may require less processing power and less processing time, as compared with the situation in which the selected image is compared with a large number of different facial profiles of general population.

In an embodiment, a similarity score may be calculated for each facial profile in comparison to the selected image based on how similar each facial profile is to the facial features of the selected image. A higher similarity score may indicate a higher similarity between a facial profile and the selected image, while a lower similarity score may indicate a lower similarity between a facial profile and the selected image. The facial profile with the highest similarity score may be selected as the matching facial profile.

At step 310, the user device 110 or the payment provider server 170 may determine whether the selected image matches any of the facial profiles of the designate payees. For example, a predetermined similarity score may be set below which the facial profile may be considered non-matching. If none of the facial profiles has a similarly score above the predetermined similarity score, it may be determined that none of the facial profiles match the selected image. If no match is found at step 310, the user device 110 or the payment provider server 170 may ask the user 105 to identify the payee at step 320. For example, a message such as "no match is found for the picture selected, please enter the name of the payee" may be displayed to the user 105. In response, the user 105 may enter the name of the payee or the user 105 may select the payee from a contact list, a social network friend list, or any other method of identifying the payee.

If the payee identified by the user 105 is not one of the designated payees for making payments by facial recognition, the system may ask user 105 whether the payee should be designated for use with making payments by facial recognition. If the user 105 agrees, the payee may be entered into the list of payees designated for payment by facial recognition. A facial profile may be created for the newly designated payee based on the selected image. On the other hand, if the payee identified by the user 105 is one of the designated payees, the selected image may be used to update the facial profile of the identified payee to improve facial recognition accuracy for the identified payee. Thus, the selected image may be used to update and/or improve the facial profile of the payee at step 316. At step 318, the user device 110 and/or the payment provider server 170 may then process payment transaction with the identified payee. For example, payment service provider may debit a payment amount from the user 105's account and may credit the payment amount to the payee's account.

Returning to step 310, if the selected image matches one of the facial profiles, the payee who is associated with the matching facial profile may be identified to the user 105 at step 312. In an embodiment, more than one payee may be identified to the user 105 because the user 105 selected images of multiple payees. At step 314, the user 105 may confirm whether the payee is identified correctly by facial recognition. If the payee is not correctly identified, the user may again be asked to identify the correct payee. The user's confirmation or feedback may be used to further update the facial profiles to improve the accuracy of facial recognition at step 316. For example, both the positive feedback, e.g., the user confirms that the identified payee is correct, and the negative feedback, e.g., the user indicates that the identified payee is incorrect and another payee is identified by the user, may be used to improve the facial profiles and the facial recognition algorithm.

At step 318, the user device 110 and/or the payment provider server 170 may then process payment transaction with the identified payee. For example, payment service provider may debit a payment amount from the user 105's account and may credit the payment amount to the payee's account. Accordingly, the user 105 may make a payment to a payee be simply selecting, e.g., clicking or tapping, an image of the payee. The image may be analyzed and the payee may be identified by facial recognition.

In an embodiment, the user 105 may tap or click on an image or a picture of a person to initiate a payment to that person. In another embodiment, the user 105 may drag and drop the image or the picture of a person onto a payment icon to initiate a payment. In still another embodiment, the user 105 may click on a payment icon and take a picture of a person using a camera including with the user device 110 to initiate a payment to the person. In some embodiments, the picture or the image selected or captured by the user 105 may include one or more payees. For example, the user 105 may use a picture of a group of individuals to initiate payments to each of the individuals in the group. The user 105 also may select one or more individuals from the group to make payments to the selected individuals. In another embodiment, the user 105 may select a photo or image of a group of individuals without having to select a specific individual from the group photo even when the user only wants to make a payment to one individual or a subset of individuals from the photo. In that case, image recognition may determine which images or individuals from the group photo may be possible payees of the user 105, such as discussed herein. All possible payees may be presented to the user for selection of the one or more desired ones.

In the above processes 200 and 300, the steps are executed at payment provider server 170. In one embodiment, the steps may be executed at user device 110. In still another embodiment, the steps may be executed by both the payment provider server 170 and the user device 110 in coordination with each other.

The following is an exemplary scenario of how the system or method may be implemented:

A user installs a payment application on the user's mobile device to make payments. The payment application may connect the user's mobile device to a server of a payment service provider to make payment transaction requests. The payment service provider may analyze the user's transaction history to identify a list of payees to whom the user frequently makes payments. The payment application may ask for the user's permission to access the user's social network or contact list to find pictures or images of these frequent payees. The payment application may forward these images or pictures to the server of the payment service provider to be analyzed for facial recognition. A face map or facial feature matrix may be established for each frequent payee. Thus, the user may make payments via facial recognition. In other embodiments, "frequent" may be defined as an individual to whom the user has made at least a single payment to, although time limits may disqualify the individual if only one payment was made several years ago.

When the user is ready to make a payment to a friend, the user may simply click on the friend's picture on the user's social network or contact list. If the user is near the friend, the user may take a picture of the friend to make a payment. The picture or the selected image may be forwarded to the payment service provider to be analyzed and identified. Based on the facial features and facial profiles, the payment service provider may recognize the friend from the list of frequent payees. Thus, the user may enter an amount of payment for the friend and the payment service provider may process the payment amount to the friend accordingly.

The above processes are not limited to facial images of a person. In an embodiment, the logo images or trademarks of a non-person entity, such as a merchant, a company, an organization, or the like may be used to identify and facilitate payment to the non-person entity. For example, a user may designate a logo of a merchant to pay the merchant by clicking on the logo. As such, a user may select a logo of a merchant to make payment to the merchant.

Figure 4:
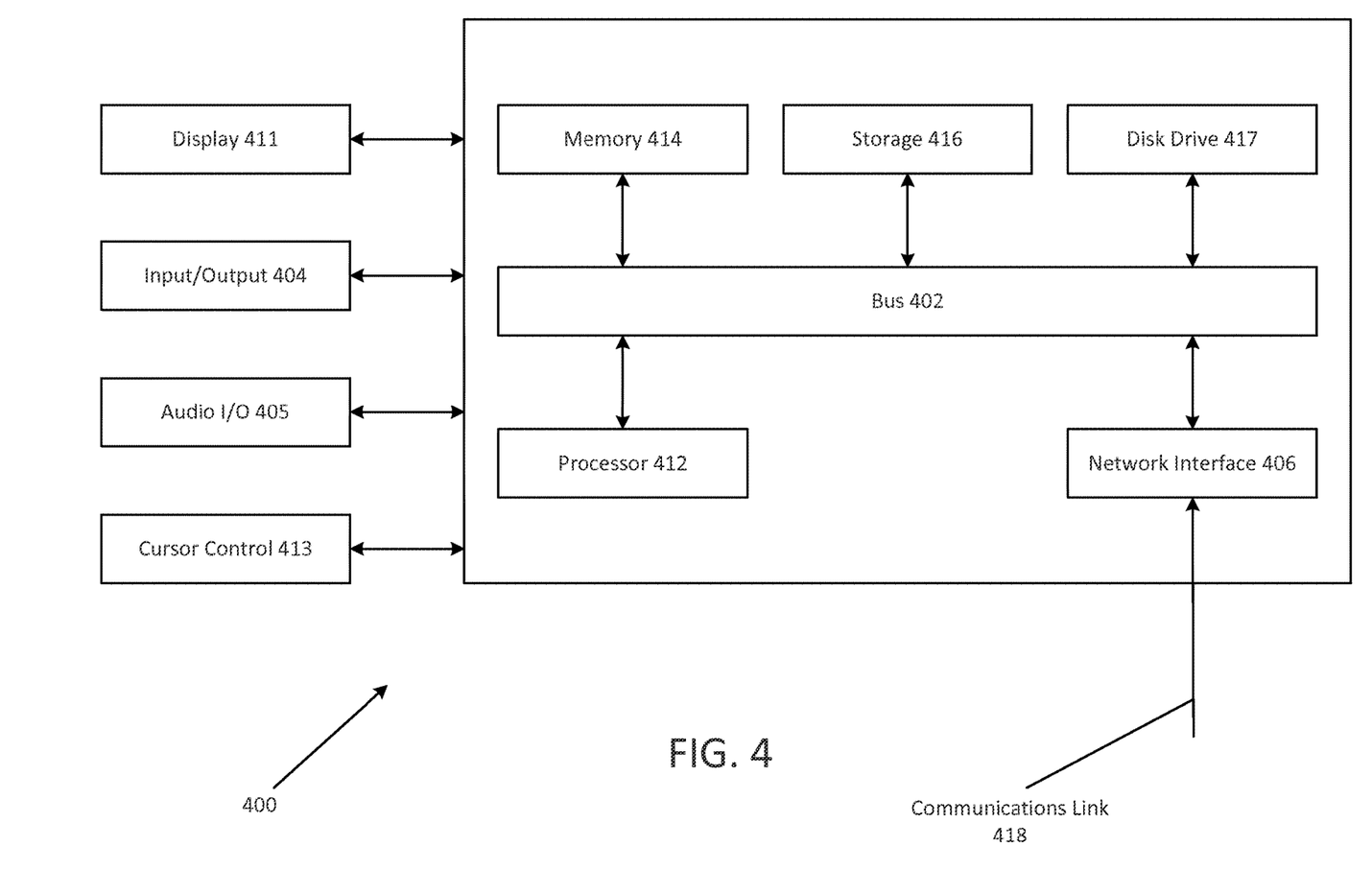
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, wearable device, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a microcontroller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
   accessing a transaction history for a user, wherein the transaction history comprises past transactions over a first set time limit associated with a plurality of payees of the past transactions within the first set time limit;
   determining an identifier for each of the plurality of payees using the transaction history;
   retrieving, from an online social networking service associated with the user, social networking information comprising images of the plurality of payees and identifications for the plurality of payees using the identifier for each of the plurality of payees;
   determining that one or more of the images from a set of images used to identify the plurality of payees are older than a second set time limit;
   updating the set of images by removing the one or more of the images from the set of images;
   generating maps of the images of the plurality of payees from the updated set of images using the social networking information and a facial recognition process, wherein the maps comprise facial feature matrices of facial features in the images of the plurality of payees from the updated set of images, and wherein the maps are associated with the identifications including contact information for each of the plurality of payees;
   receiving, from a camera of a user device for the user, a first image captured by the user for making a payment via facial recognition, wherein the first image captures a plurality of potential payees including a payee of a transaction;
   automatically identifying the payee represented by the first image from the plurality of potential payees by the facial recognition process using only the maps and the first image without requiring additional input to an application displaying the first image to identify the payee;
   generating a selectable text option to process the payment to the payee based on the automatically identifying the payee;
   in response to a request to display the first image using an interface of the user device, outputting the selectable text option with the payee in the first image, wherein the selectable text option identifies the payee in the first image to process the payment; and
   in response to a selection of the selectable text option, processing the payment.

2. The system of claim 1, wherein the facial recognition process comprises:
   analyzing the first image to determine the facial features within the first image;
   comparing the facial features within the first image with the facial feature matrices; and
   determining a facial feature matrix of the facial feature matrices that matches the facial features of the first image.

3. The system of claim 2, wherein the facial recognition process comprises:
   calculating similarity scores for the facial feature matrices, each of the similarity scores indicating a degree of similarity between the first image and a facial feature matrix of the facial feature matrices; and
   determining the facial feature matrix of the facial feature matrices based on the similarity scores.

4. The system of claim 3, wherein the facial feature matrix has a highest similarity score of the similarity scores.

5. The system of claim 1, wherein the operations further comprise:
   receiving a response from the user indicating whether the payee identified by the facial recognition process is correct; and
   updating the maps with the first image based on the response.

6. The system of claim 5, wherein the operations further comprise updating the maps with the first image of the payee identified by the facial recognition process based on the first image when the response from the user indicates that the payee identified by the facial recognition process is correct.

7. The system of claim 5, wherein the operations further comprise requesting the user to identify a different payee of the plurality of potential payees associated with the first image when the user indicates that the payee identified by the facial recognition process is incorrect.

8. The system of claim 7, wherein the operations further comprise:
   adding the different payee identified by the user to the plurality of payees; and generating a map of the first image for the different payee identified by the user.

9. The system of claim 1, wherein the selectable text option comprises a link on the interface of the user device to a transaction processor process for completing payment.

10. A method comprising:
accessing a transaction history of a payment account for a user, wherein the transaction history comprises past transactions over a first set time limit with a plurality of payees by the user using the payment account within the first set time limit;
determining an identifier for each of the plurality of payees using the transaction history;
retrieving, from an online social networking service associated with the user, social networking information comprising images of the plurality of payees and identifications for the plurality of payees using the identifier for each of the plurality of payees;
determining that one or more of the images from a set of images used to identify the plurality of payees are older than a second set time limit;
updating the set of images by removing the one or more of the images from the set of images;
generating maps of the images of the plurality of payees from the updated set of images using the social networking information and a facial recognition process, wherein the maps comprise facial feature matrices of facial features in the images of the plurality of payees from the updated set of images, and wherein the maps are associated with the identifications including contact information for each of the plurality of payees;
receiving, from a camera of a user device for the user, a first image captured by the user for making a payment via facial recognition, wherein the first image captures a plurality of potential payees including a payee of a transaction;
identifying, by a hardware processor, the payee represented by the first image from the plurality of potential payees via the facial recognition process using only the maps and the first image without requiring additional input to an application displaying the first image to identify the payee;
generating a selectable text option to process the payment to the payee based on the identifying the payee;
in response to a request to display the first image using an interface of the user device, outputting the selectable text option with the payee in the first image, wherein the selectable text option identifies the payee in the first image to process the payment; and
in response to selection of the selectable text option, processing the payment.

11. The method of claim 10 further comprising:
collecting the images of the plurality of payees via facial recognition.

12. The method of claim 11, wherein the images of the plurality of payees are further collected from one or more of a contact list of the user, a digital photo album of the user, or images captured by the user.

13. The method of claim 11, wherein the maps comprise information indicating unique facial features of the respective payees designated for payment via facial recognition.

14. The method of claim 11, wherein the maps are updated periodically with newly received images of the plurality of payees designated for payment via facial recognition.

15. The method of claim 9, wherein the selectable text option comprises a link on the interface of the user device to a transaction processor process for completing payment.

16. A non-transitory machine-readable medium having stored thereon machine-readable instructions executable to cause a computer system to perform operations comprising:
accessing a transaction history of a payment account for a user, wherein the transaction history comprises past transactions over a first set time limit with a plurality of payees by the user using the payment account within the first set time limit;
determining an identifier for a payee of the plurality of payees using the transaction history;
retrieving, from an online social networking service associated with the user, social networking information comprising images of the payee and identification for the payee using the identifier;
determining that one or more of the images from a set of images used to identify the of payee are older than a second set time limit;
updating the set of images by removing the one or more of the images from the set of images;
generating a map of the images of the payee from the updated set of images using the social networking information and a facial recognition process, wherein the map comprises at least one facial feature matrix of facial features in the images of the payee from the updated set of images, and wherein the map is associated with the identification including contact information for the payee;
receiving, from a camera of a user device for the user, a first image captured by the user for making a payment via facial recognition, wherein the first image captures a plurality of potential payees including a payee of a transaction;
automatically identifying the payee represented by the first image from the plurality of potential payees via the facial recognition process using only the map and the first image without requiring additional input to an application displaying the first image to identify the payee; and
generating a selectable text option to process the payment to the payee based on the automatically identifying the payee;
in response to a request to display the first image using an interface of the user device, outputting the selectable text option with the payee in the first image, wherein the selectable text option identifies the payee in the first image to process the payment; and
in response to selection of the selectable text option, processing the payment.

17. The non-transitory machine-readable medium of claim 16, wherein the operations further comprise presenting an option for payment via facial recognition in a pop-up menu when the user selects the first image.

18. The non-transitory machine-readable medium of claim 17, wherein the operations further comprise providing the option for payment via facial recognition to the first image displayed by a user device of the user.

19. The non-transitory machine-readable medium of claim 16, wherein the selectable text option comprises a link on the interface of the user device to a transaction processor process for completing payment.

* * * * *

UNITED STATES PATENT AND TRADEMARK OFFICE
CERTIFICATE OF CORRECTION

PATENT NO. : 10,043,184 B2
APPLICATION NO. : 14/292061
DATED : August 7, 2018
INVENTOR(S) : Agarwal et al.

It is certified that error appears in the above-identified patent and that said Letters Patent is hereby corrected as shown below:

In the Claims

In Claim 15, Column 14, Line 1 change "The method of claim 9" to --The method of claim 10--.

Signed and Sealed this
Fourth Day of December, 2018

Andrei Iancu
*Director of the United States Patent and Trademark Office*